United States Patent [19]

Szücz et al.

[11] Patent Number: 4,983,301
[45] Date of Patent: Jan. 8, 1991

[54] METHOD AND APPARATUS FOR TREATING FLUIDS CONTAINING FOREIGN MATERIALS BY MEMBRANE FILTER EQUIPMENT

[76] Inventors: Lászlóné Szücz, Koszta József u.43.; Attila Szücs, Liptó u.8., both of Budapest, Hungary, H-1124

[21] Appl. No.: 274,144
[22] Filed: Sep. 15, 1988

[30] Foreign Application Priority Data

Mar. 6, 1987 [HU] Hungary .............................. 955/87
Apr. 7, 1987 [HU] Hungary .............................. 955/87
Nov. 10, 1987 [HU] Hungary .............................. 955/87

[51] Int. Cl.$^5$ ........................................... B01D 61/06
[52] U.S. Cl. ..................................... 210/636; 210/650; 210/652; 210/321.66
[58] Field of Search ................. 210/257.2, 195.2, 652, 210/650, 321.66, 651, 636

[56] References Cited

U.S. PATENT DOCUMENTS 3,630,378 12/1971 Bauman .................. 210/257.2 X
4,207,183 6/1980 Herrigel ..................... 210/651 X

FOREIGN PATENT DOCUMENTS 2026893 2/1980 United Kingdom ............ 210/257.2

Primary Examiner—Frank Spear
Attorney, Agent, or Firm—Young & Thompson

[57] ABSTRACT

A raw fluid containing foreign materials is led to the inlet of a membrane filter equipment (10) which provides on the one hand a concentrate containing more foreign materials than that of the raw fluid, on the other hand a permeate containing less foreign materials than that of the raw fluid. The concentrate leaving the membrane filter equipment (10) is fed back entirely to the inlet of the membrane filter equipment (10) and the fluid is circulated under high pressure until a predetermined concentration value is reached, then the concentrated fluid is discharged and steps are repeated with a further amount of raw fluid. A continuous operation of the membrane filter equipment (10) and a pump (13) ensuring a high pressure in it can be provided by two vessels (34, 35) which are arranged in the fluid circuit and adapted to be switched over.

24 Claims, 14 Drawing Sheets

METHOD AND APPARATUS FOR TREATING FLUIDS CONTAINING FOREIGN MATERIALS BY MEMBRANE FILTER EQUIPMENT

TECHNICAL FIELD

Subject matter of the invention is a method and an apparatus for treating fluids containing foreign materials by a membrane filter equipment.

BACKGROUND ART

There are known apparatuses which make possible to decrease the contents of foreign materials of fluids by an arrangement in which the fluid streams along a thin membrane filter while the pressure of the fluid is higher then the pressure existing on the other side of the membrane filter. The streaming fluid is generally a solution and one part of it is pressed through the membrane filter (permeate). The composition of the permeate differs from the composition of the original solution because the permeability of the membrane filter is different for ions and particles of different sizes.

If the method utilizes only the fact that the size of pores of the membrane filter lies in the order of sizes of ions or particles and so the membrane filter filters (withdraws) the the bigger ions and particles in some way, then the method is called ultra or microfiltering. If there is a significant difference of osmotic pressure between the two sides of the membrane filter, then after having equalized that and bringing up an opposite pressure difference, higher than it has been there previously, a phenomenon reverse to the usual osmosis, the so called reverse osmosis appears. The solvent streams through the membrane filter from the solution against the osmosis pressure to the space containing solvent. In the operation of the membrane filter equipment the energy consumption is determined mostly by the pump necessary to feed the fluid to be treated (i.e. raw fluid) to the equipment under high pressure (e.g. 50-70 bars). In order to decrease the energy consumption there have been proposed an arrangement in which a water turbine is driven by the high pressure concentrated fluid (concentrate) leaving the membrane filter equipment for getting back a part of the energy. However, in the practice this solution needs great investment and the quick rotating water turbine makes the operation and maintenance of the whole water purification system complicate.

Energy recovery is objected also by the solution described in U.S. Pat. No. 4,354,939. According to this the concentrate leaving the membrane filter equipment is fed to two containers alternatively. Each container has two spaces separated from each other by a flexible membrane. When the concentrate gets into the first space of one of the containers, a pump feeds back raw fluid from the second space to the inlet of the membrane filter equipment. When the first space, namely almost the whole container has been filled with concentrate, the concentrate is being fed to the other container, and meanwhile from said one of the containers the concentrate is being discharged by the raw fluid fed to the second space of this container.

In said membrane filter equipments the raw fluid streams along the membrane filter. From the point of view of the permeate-flow through the membrane the concentration of two boundary layers situated closely to both sides of the membrane is determinative. The concentration of the boundary layer is always higher than the mean concentration of the whole solution-flow. Namely, the solvent passes from the inside of the solution towards the membrane filter which withdraws the mass of the solved materia but lets the solvent get through, therefore the solved materia becomes concentrated in the boundary layer. The difference of the osmotic pressure is proportional to the difference of the concentrates in the boundary layers. Because of the phenomenon described the osmotic pressure increases and thus the energy consumption increases, too. In the case of ultra or microfiltration the hydralic resistance of the membrane filter increases because of the increase in the concentration of the solution fed into the membrane filter (this appears obviously in the case of revers osmosis, too and causes a further increase in the pressure). The phenomena mentioned above are frequently called polarization, too. The thickness of the boundary layer and so the concentration increase diminish if the speed of the solution (more exactly the R number proportional to the speed) becomes higher. Solvent is leaving the solution which is flowing along the membrane filter. At the end of the membrane filter, at the outlet, the mean concentration is equal to the concentration of the solution just leaving the equipment. If the quantity of the solution fed into the equipment is n times the quantity of the permeate pressed through the membrane, consequently the so called gain is $1/n$, then at the outlet the mean concentration will be $n/(n-1)$ times higher than at the inlet. Because of the mentioned relation between the concentration and the osmotic pressure it would be advantageous if n was higher, but by this the gain $(1/n)$ would decrease.

It has been proposed that for decreasing the thickness of the boundary layer the raw fluid should be circulated through the membrane filter equipment. The raw fluid is continuously fed by a high pressure pump into the circle of fluid circulated and from this on one hand the permeate and on the other hand the fluid concentrated leave continuously. A disadvantage of this method is that the concentrate of the fluid fed into the membrane filter equipment will be higher than that of the raw fluid and thus the increase in the osmotic pressure results in just an opposit effect. Consequently, it is worthful to let the fluid circulated in this way only if the advantage caused by the fact that the boundary layer becomes thinner is greater than the disadvantage caused by the increase in the concentration. This method has reason when the concentration of the raw fluid is very small. But this method is not advantageous for the treatment of solutions of higher concentration e.g. for desalination of sea-water. The energy of the concentrate continuously leaving the membrane filter equipment gets lost unless there is any other way for recovering it, e.g. by a water turbine.

In the methods mentioned above the membrane filter equipment is of a steady state operation thus the concentration and the speed of the fluid flowing in it depends only on the place. The speed of flow has to be chosen suitable to the concentration of the raw fluid and to the maximal concentration allowed for the membrane filter equipment.

DISCLOSURE OF THE INVENTION

According to the invention the membrane filter equipment operates periodically, the concentration of the fluid passing through the equipment increases continuously between the beginning and the end of a period and reaches the maximal value of concentration allowed for the membrane filter equipment at the end of the period, only.

Thus, on the one hand the invention is a method for treating fluids containing foreign materials by a membrane filter equipment, comprising the steps of supplying a fluid to be treated to an inlet of the membrane filter equipment, which provides a concentrate containing more foreign materials than that of the fluid to be treated and a permeate containing less foreign materials than that of the fluid to be treated, and circulating the fluid through the membrane filter equipment by feeding back at least a part of the concentrate leaving the membrane filter to the inlet of the membrane filter equipment. The invention is characterised by feeding back the whole concentrate leaving the membrane filter equipment to said inlet and circulating the fluid under high pressure until the fluid reaches a predetermined concentration value, then discharging the concentrated fluid and repeating said steps with a further amount of fluid to be treated.

The method according to the invention—as it will be explained in details in the following—needs less energy in comparison to the methods known up to date. A further advantage is that the membrane filter equipment operating periodically is washed through periodically by a fluid of a concentration equal to that of the raw fluid which improves the selfpurification and decreases the need for maintenance.

On the other hand, the invention is an apparatus for treating fluids containing foreign materials, comprising a membrane filter equipment having an inlet for receiving the fluid to be treated an outlet providing a concentrate and another outlet providing a permeate; a fluid circle in which fluid is circulated which is connected between the outlet providing the concentrate and the inlet; a pump ensuring high pressure in the fluid circle during the circulation; means for feeding the fluid to be treated into the fluid circle and a device leading the concentrate off. The apparatus is characterised according to the invention in that the fluid circle is adapted to a periodical operation and at least a part of the fluid circle is connected by at least one control valve to the device leading the concentrate off, said at least one valve being closed during the fluid circulation periods but being open after the fluid circulation periods.

In a very advantageous embodiment of the invention, in spite of the periodical operation, the membrane filter equipment and the pump providing the high pressure—these are the most expensive elements of the apparatus—work continuously, thus the utilization of them is perfect.

The invention and its advantages are explained in the following description more detailed by advantageous embodiments shown in the drawings.

MODES FOR CARRYING OUT THE INVENTION

Figure 1:
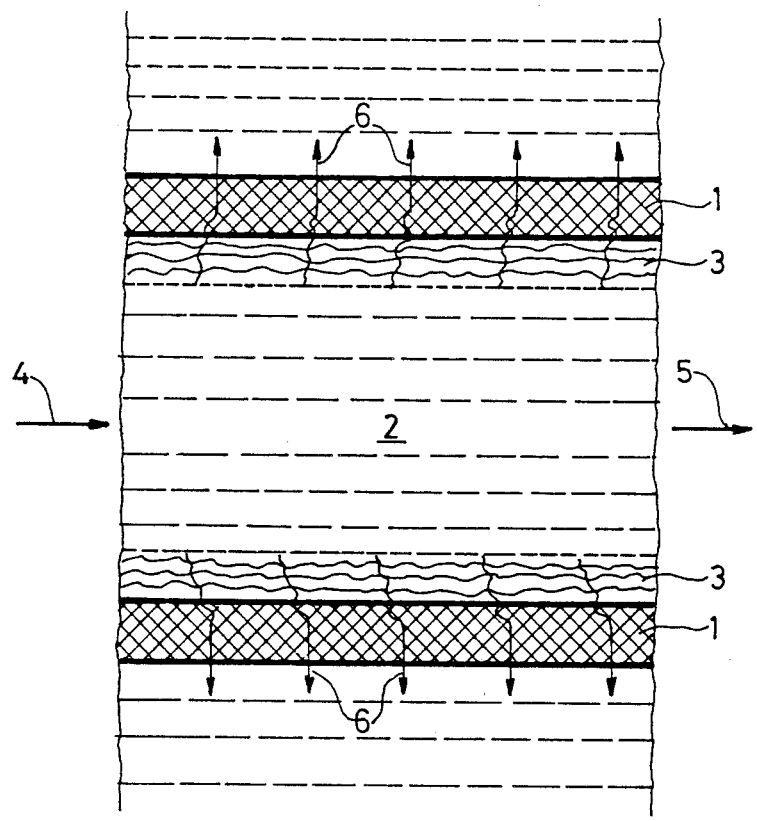
FIG. 1 is a schematic sectional view of a detail of a membrane filter equipment.

Before disclosing the invention, the basic features of operation of a membrane filter equipment are briefly summarized according to FIG. 1. In the following the fluid containing foreign materials is a salt solution for the sake of simplicity and the invention is described on the basis of embodiments suitable for desalination of seawater. However, the invention, mutatis mutandis, can be applied in all fields of separation or filtration techniques of membrane filter type. Such applications are e.g. denitrification of drinking water, concentration of solutions, distillation of water, filtration of dirty water. The invention is not restricted to water but it is applicable to other fluids e.g. to alcohol, or to other industrial solutions. The foreign material may be solved in the fluid (e.g. salt solution) or may be mixed in (e.g. colloid particles or sand in water).

FIG. 1 illustrates a detail of a membrane filter equipment in which the fluid 2 to be treated flows in a membrane filter 1 shaped in a thin tubular form. In the equipment a great number of this type of thin tubes are connected in parallel. Arrow 4 shows the inlet of the raw fluid, and arrow 5 shows the outlet of the concentrated raw fluid (concentrate). Permeate 6 comes out of the equipment through membrane filter 1 while the fluid 2 of high pressure passes along membrane filter 1. The volume of the inlet fluid is equal to the sum of the volume of the outlet concentrate and the volume of the permeate. The quotient of the quantity of the outlet permeate and inlet fluid is called gain of the equipment. This is $i/n$ if n is the quotient of the inlet fluid and the permeate. Supposing that the concentration of the permeate is much less than that of the inlet fluid, the outlet mean concentration is $$x_{OUT} = x_{IN} \frac{n}{n-1}, \quad (1)$$

where $x_{IN}$ is the inlet mean concentration and n is the reciprocal of the gain.

Near to the wall of the membrane filter 1 concentration $x_H$ of boundary layer 3 is always higher than the mean concentration x of the solution streaming through the same cross-section, i.e.

$$x_H = \sigma \cdot x, \quad (2)$$

where $\sigma$ is a factor higher than 1. For the process the mean concentration of the boundary layer 3 is determinative which is $$x_M = \frac{x_{HIN} + x_{HOUT}}{2} = \frac{\sigma}{2}(x_{IN} + x_{OUT}). \quad (3)$$

By substitution of the equation (1) it comes that $$x_M = x_{IN}\frac{\sigma}{2}\left(1 + \frac{n}{n-1}\right). \quad (4)$$

Figure 2:
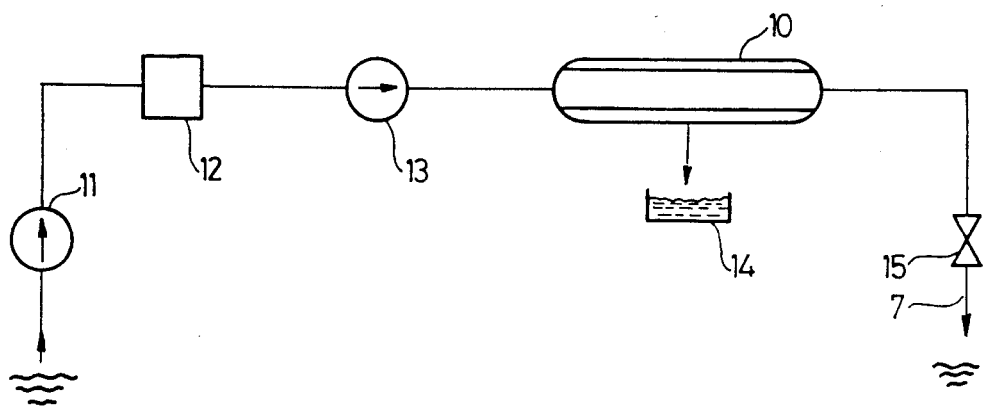
FIGS. 2 to 4 are connection diagrams of known apparatuses with membrane filter equipments.

In FIG. 2 there is a simple apparatus already known. A water supply pump 11 drives the fresh seawater through a water pretreatment equipment 12 under low pressure, subsequently the filtered and pretreated water is driven by a high pressure pump 13 into a membrane filter equipment 10, where it passes along the membrane filtering surfaces of the membrane filter. Pure water flows from the membrane filter equipment 10 through the membrane filtering surfaces to a permeate vessel 14, the concentrated seawater passes through a throttle valve 15 and an outlet device 7 leading the concentrate off. The device 7 leading the concentrate off may be e.g. a pipe. The energy consumption is determined mainly by the high pressure pump 13. If behind the membrane filter the pressure is P bar (at desalination of seawater it is cca 50–70 bars), then the energy consumption for 1 m³ of pure water is $$N = \frac{P \cdot n}{36\eta_{sz}} \; [kWh/m^3], \quad (5)$$

where $\eta_{sz}$ is the efficiency of the pump 13 and n is a quotient of the quantity of the seawater pressed into the membrane filter equipment 10 and that of the pure water outlet of the membrane filter equipment 10, i.e. the reciprocal of the gain.

Figure 3:
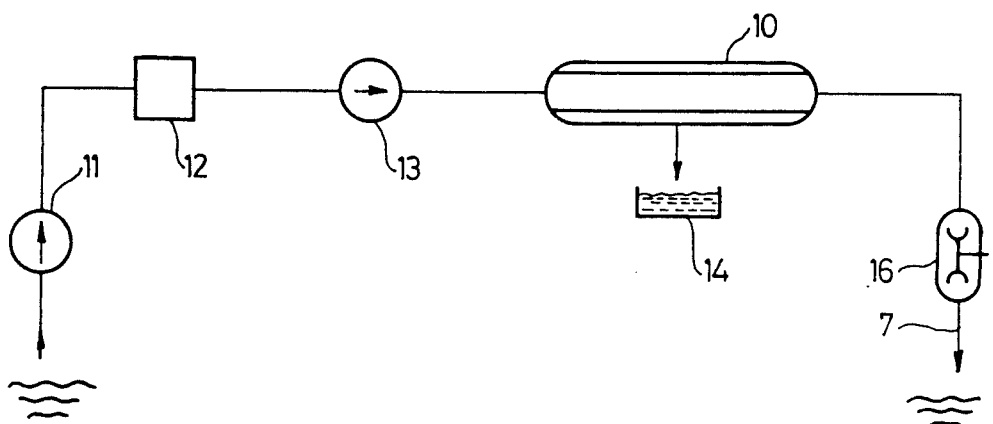

The energy consumption is decreasing if the concentrated water delivered back to the sea, is led through a water turbine 16 instead of the throttle valve 15, as it is shown in FIG. 3. Thus, though the apparatuses are expensive and complicated, it is possible to regain a part of the wasting energy. By using the water turbine 16, the energy consumption is $$N = \frac{P \cdot n}{36\eta_{sz}}\left[1 - \eta_{sz}\eta_t\frac{n-1}{n}\left(1 - \frac{\Delta P}{P}\right)\right][kWh/m^3], \quad (6)$$

where $\eta_t$ is the efficiency of the water turbine 16 and $\Delta P$ is the pressure drop along the membrane filter in bars (practically 2–3 bars).

Figure 4:
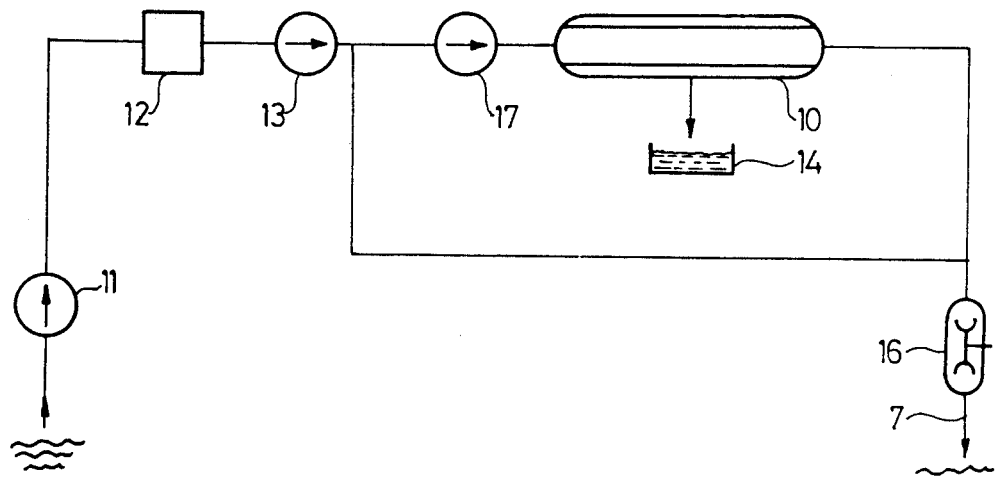

There has been mentioned, that the speed of the solution flowing in the membrane filter equipment 10 influences the thickness of the boundary layer, however this effect can be decreased by applying recirculation known by itself as shown in FIG. 4. In this case the concentrate outlet of the membrane filter equipment 10 is fed besides to the water turbine 16 back to the inlet of the membrane filter equipment 10 by interconnection of a circulation pump 17. The recirculation increases the average mean concentration of the solution flowing along the membrane filter, because the mean concentration of the solution flowing into the membrane filter equipment 10 is higher, and therefore tha value of P is increasing, but at the same time the thickness of the boundary layer decreases and by this effect the value of P is being decreased. An optimum value arises from the two opposite effects. The energy consumption supposing that efficiency of the pump 17 is also $\eta_{sz}$ is $$N = \frac{P \cdot n}{36\eta_{sz}}\left[1 - \eta_{sz}\eta_t\frac{n-1}{n}\left(1 - \frac{\Delta P}{P}\right) + \frac{k}{n}\frac{\Delta P}{P}\right][kWh/m^3], \quad (7)$$

where k is the quotient of the quantity of the brine delivered by the circulation pump 17 and the quantity of the pure water (permeate) coming out of the membrane filter equipment 10.

Finally for making possible the estimation of the different arrangements correctly, let us calculate the energy consumption of an "ideal" apparatus. There is a water turbine 16 in the ideal apparatus (FIG. 3 and FIG. 4), the values of efficiencies are $\eta_{sz} = \eta_t = 1$, the pressure drop along the membrane filter is $\Delta P = 0$ and the value of P is the osmotic pressure or the possible minimal pressure $P_o$ determined by the size of the filter. Hence, the energy consumption is $$N_o = \frac{P_o}{36} \; [kWh/m^3] \quad (8)$$

Let $\sigma^*$ be the quotient of the actual pressure P and the pressure $P_o$ arising in the ideal case:

$$\sigma^* = \frac{P}{P_o}. \quad (9)$$

From equations (8) and (9) it comes that $$\frac{P}{36} = N_o \cdot \sigma^*. \quad (10)$$

By substitution of equation (10) into equation (7) and arranging:

$$N = N_o \cdot \sigma^* \cdot \left(n\left[\frac{1}{\eta_{sz}} - \eta_t\left(1 - \frac{\Delta P}{P}\right)\right] + \frac{k}{\eta_{sz}}\frac{\Delta P}{P} + \eta_t\left(1 - \frac{\Delta P}{P}\right)\right). \quad (11)$$

Assuming realistic values of $\eta_{sz} = 0.5$, $\eta_t = 0.75$ and $\Delta P/P = 0.05$, the energy consumption is $$N = N_o \cdot \sigma^*(1.29 \cdot n + 0.1 \cdot k + 0.713). \quad (12)$$

As the minimal value of n is 3–4, supposing an advantageous case and calculating with n=3 and k=3, it is got that $$\frac{N}{N_o \cdot \sigma^*} = 4.88. \quad (13)$$

In practice the water turbine 16 is applied scarcely because of the heavy operational and maintenance problems of the high speed rotating machine. Therefore, by substitution of $\eta_t = 0$ into equation (11), it is got with the values mentioned before, that $$N = N_o \cdot \sigma^* (2 \cdot n + 0.1 \cdot k). \quad (14)$$

Consequently $$\frac{N}{N_o \cdot \sigma^*} = 6.3. \quad (15)$$

Figure 5:
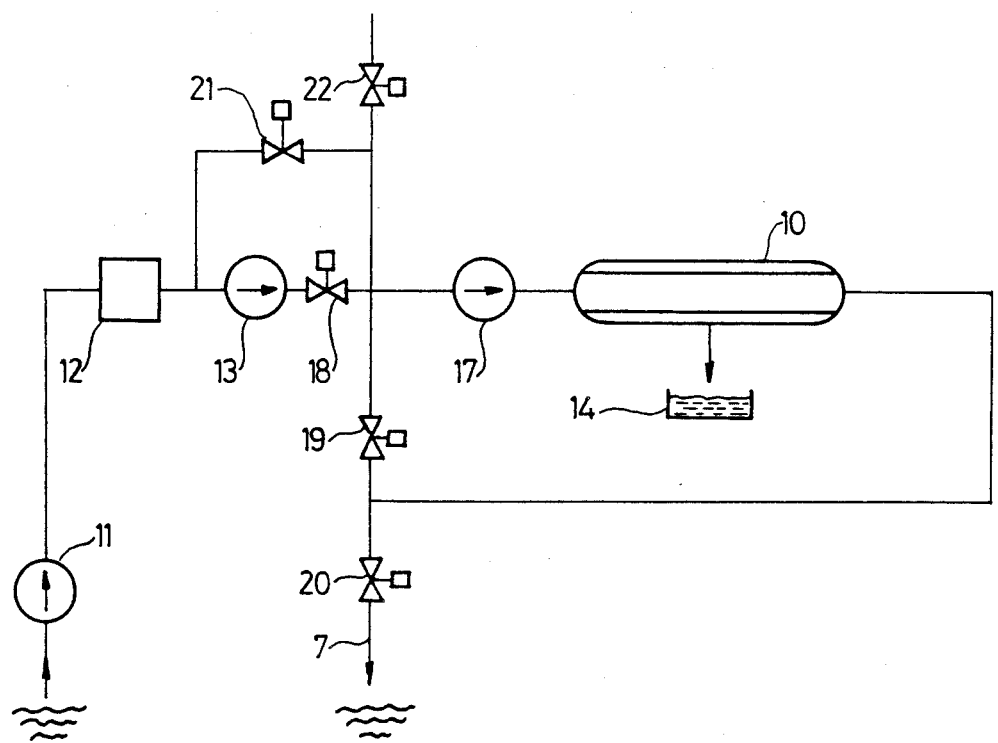
FIG. 5 is a schematic connection diagram of an embodiment of the apparatus according to the invention.

FIG. 5 shows a simple embodiment of the apparatus according to the invention. The seawater provided by a water supply pump 11 through a water pretreatment equipment 12 known by itself is pressed into a fluid circle by a high pressure pump 13 through a control valve 18. In that fluid circle there are connected in series a circulation pump 17, a membrane filter equipment 10 and a control valve 19. The pump 17 provides only circulation. The increasing of pressure caused by it is little, its power consumption is unsignificant. The concentrate outlet of the membrane filter equipment 10 is connected to the device 7 leading concentrate off through a valve 20, said device 7 is a pipe directed into the sea in the embodiment shown. The permeate outlet of the membrane filter equipment 10 is connected to a permeate vessel 14. The pump 13 delivers only such quantity of pretreated seawater to the membrane filter equipment 10 under high pressure, which quantity leaves as permeate for the vessel 14. The outlet of water pretreatment equipment 12 is connected to the fluid circle through a control valve 21 and the fluid circle is connected to the atmosphere through a control valve 22.

Three sequential phases feature the operation of the apparatus. In the phase of water purification the pump 11 provides seawater for the water pretreatment equipment 12 in a quantity equal to the quantity of the pure water produced, and the pretreated water is supplied by the pump 13 under high pressure (50–70 bars) existing in the membrane filter equipment 10. In this phase only valves 18 and 19 are open, the other valves 20, 21 and 22 are closed, and all of the pumps 11, 13 and 17 are working. When this phase starts the apparatus is filled with pretreated seawater of low—as in the sea—concentration. Up to the end of this phase the same quantity of pretreated seawater is supplied by pump 13 to the fluid circuit as quantity of pure water (permeate) which leaves through the membrane filter. The concentration of the circulating water is increasing obviously and this first phase comes to its end when the concentration has reached the value allowed for the membrane filter equipment 10.

From the point of view of the process the mean value of the starting and final concentration measurable in this first phase is determinative, which mean value is independent from the power of the circulation pump 17 in contrary to the apparatus according to FIG. 4 where the more quantity is recirculated by the pump 17, the smaller is the difference between the inlet and outlet concentrations.

In order to be able to estimate the savings caused by this, let us suppose that in the arrangement according to FIG. 4 the half of water leaving the concentrate outlet of the membrane filter equipment 10 is recirculated to reach a suitable flow speed. In this case the inlet concentration is being increased so, that the difference between the inlet and outlet concentrations is being decreased cca to the half of its original value. If the salt content of the fresh seawater is 4.2%, and that of the leaving seawater is 5.6%, then this values change to 4.9% and 5.6% because of the recirculation. Without recirculation the average mean concentration would have been $(4.2 + 5.6)/2 = 4.9\%$, but it increases to $(4.9 + 5.6)/2 = 5.25\%$ because of the recirculation. Certainly, the recirculation increases the speed therefore the surplus concentration arising in the boundary layer decreases cca from 1% to cca 0.4%. From the point of view of calculating of the osmotic pressure difference this concentration is determinative, which decreases from $4.9 + 1.0 = 5.9\%$ to $5.25 + 0.4 = 5.65\%$ as a result of the recirculation.

In the arrangement according to the invention as shown in FIG. 5 the 1% is also decreased to 0.4% by the recirculation, but the starting and final concentrations do not change, thus the mean concentration of 5.9% without circulation decreases to $4.9 + 0.4 = 5.3\%$. Hence, the investment of the same work of circulation results in a concentration decreasing $5.9 - 5.3 = 0.6\%$ instead of $5.9 - 5.65 = 0.25\%$ if the arrangement is applied according to FIG. 5 instead of that according to FIG. 4.

The water purification phase is followed by the discharge phase according to FIG. 5, when valves 20 and 22 are open, only. In this case the pump 17 pushes heavy concentrate being in the membrane filter equipment 10 back to the sea and in the place of this concentrate air is flowing through the valve 22. During this phase pumps 11 and 13 do not deliver anything and no permeate is generated.

Having finished the discharge phase, a filling phase is starting. At that time only the valves 21 and 20 are open until filling water appears at the valve 20. During filling the pumps 11 and 17 are working, pump 13 does not deliver anything thus permeate is not generated. Filling phase is followed by a water purification phase again, so a new period is starting.

In the different phases the open valves and the working pumps are the following.
Water purification: 18, 18; 11, 13, 17
Discharge: 20, 22; 17
Filling: 20, 21; 11, 17.

The phase of water purification lasts until the concentration of the amount of the fluid circulated reaches a value allowed for the membrane filter equipment 10. The end of this phase can be adjusted in many ways. It is possible to measure the value of concentration itself or the pressure in the circulating fluid or any parameter of the circulating fluid which is characteristic to the concentration. The delay of the phase can be adjusted to a fixed value of time, too on the basis of design or measurements.

It is a disadvantage of the embodiment according to FIG. 5 that, in the case of some types of membranes, the contained quantity of water in the membrane filter equipment 10 is little, and so the phase of water purification is too short. It may be also a problem that during the discharge phase the membrane filter equipment 10 is filled by air.

Figure 6:
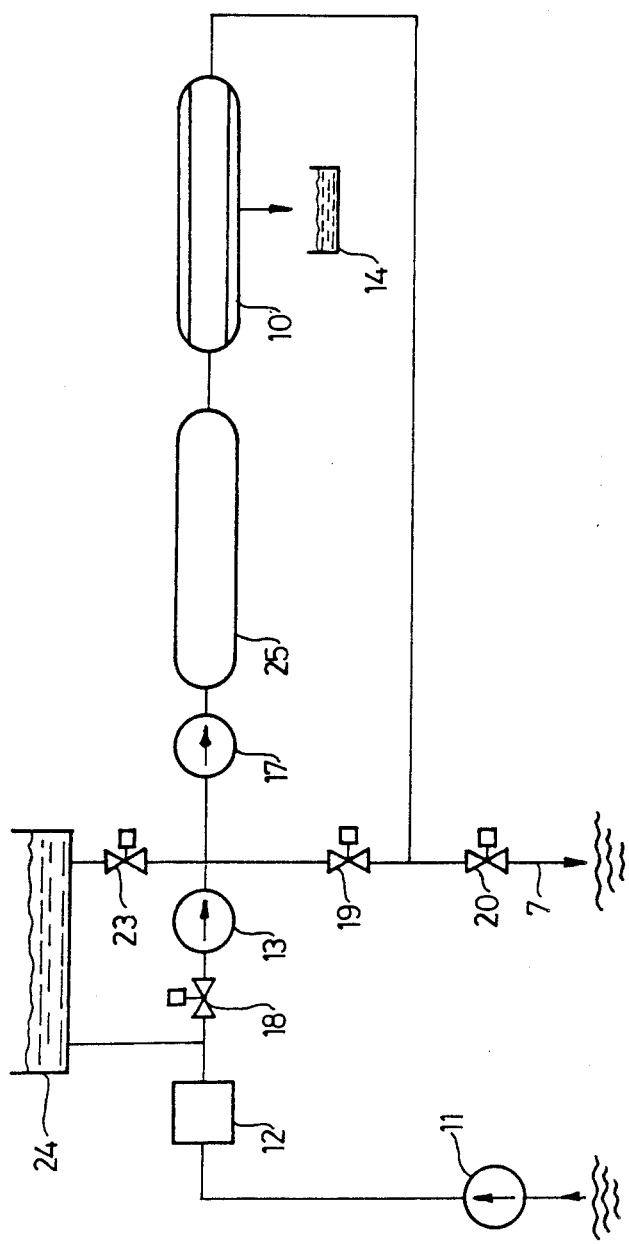
FIG. 6 is a connection diagram of an embodiment of the apparatus according to the invention completed with a reserve vessel.

In FIG. 6 the volume of the fluid circle is increased by a vessel 25 connected in series to the membrane filter equipment 10, and the airless operation of the membrane filter equipment 10 is ensured by a vessel 24 containing raw water. In every phase the pretreated water is delivered by the water supplying pump 11 to the reserve vessel 24 and from that in the common phases of filling-discharge the pretreated water gets through a valve 23 to the vessel 25 and the membrane filter equipment 10, from which the concentrated water is pushed out by it through the valve 20. Obviously, depending on the circumstances, it may be advantageous to use only one of the vessels 24 and 25. It is worth mentioning that applying the vessel 24 makes it possible to use less expensive pump 11 and water pretreatment equipment 12, both of them featured by reduced volumetric power and consequently by smaller size, furthermore it makes possible the continuous operation of the pumps 11 and 17.

In the different phases the open valves and the working pumps are the following.
Water purification: 18, 19; 11, 13, 17
Filling-discharge: 20, 23; 11, 17.

In the embodiments illustrated in FIGS. 5 and 6 and in the further figures it is not necessary to use the valve 18 connected in series to the pump 13 if the pump 13 is still working during the phase of filling and discharge. Certainly, the pump 13 must deliver against very little pressure in such a case. The possibility and economics of such a mode of operation can be estimated only if the type of the pump 13 is known.

It may be that the power of the pump 17 does not make possible a filling quick enough. In this case—according to FIG. 7—it is useful to apply a pump 26 which is working only during the filling phase and feeds fresh water from the vessel 24 through a valve 27 into the vessel 25 during the filling-discharge phases.

In the different phases the open valves and the working pumps are the following.
Water purification: 18, 19; 11, 13, 17
Filling-discharge: 20, 23, 27; 11, 17, 26.

Figure 7:
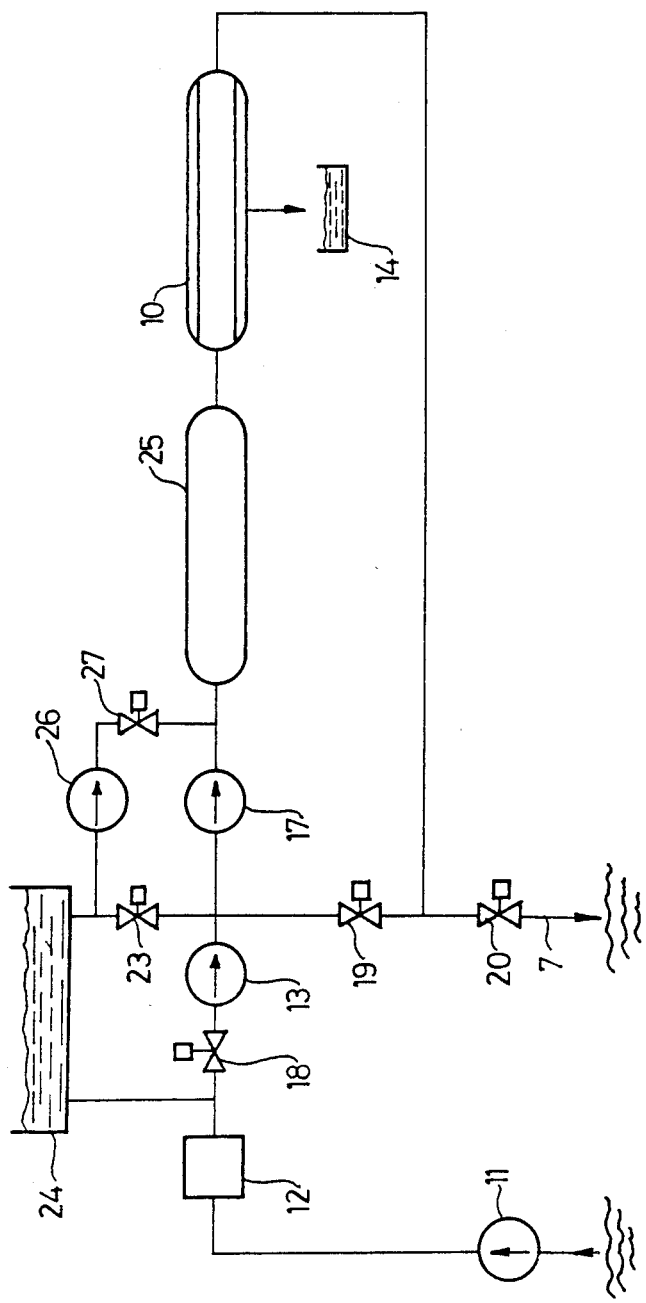
FIG. 7 is a connection diagram of an embodiment similar to that shown in FIG. 6.

In the arrangement according to FIGS. 6 and 7 the change of the pretreated fresh solution and the solution already concentrated is ideally perfect, if the concentrated solution is pushed out of the fluid circle by the fresh solution without mixing. This can be achieved in such a way that all of the equipments are made of long, tight channels connected in series, only. Such a construction is often expensive, mainly in the case of the vessel 25 allowed for high pressure.

Figure 8:
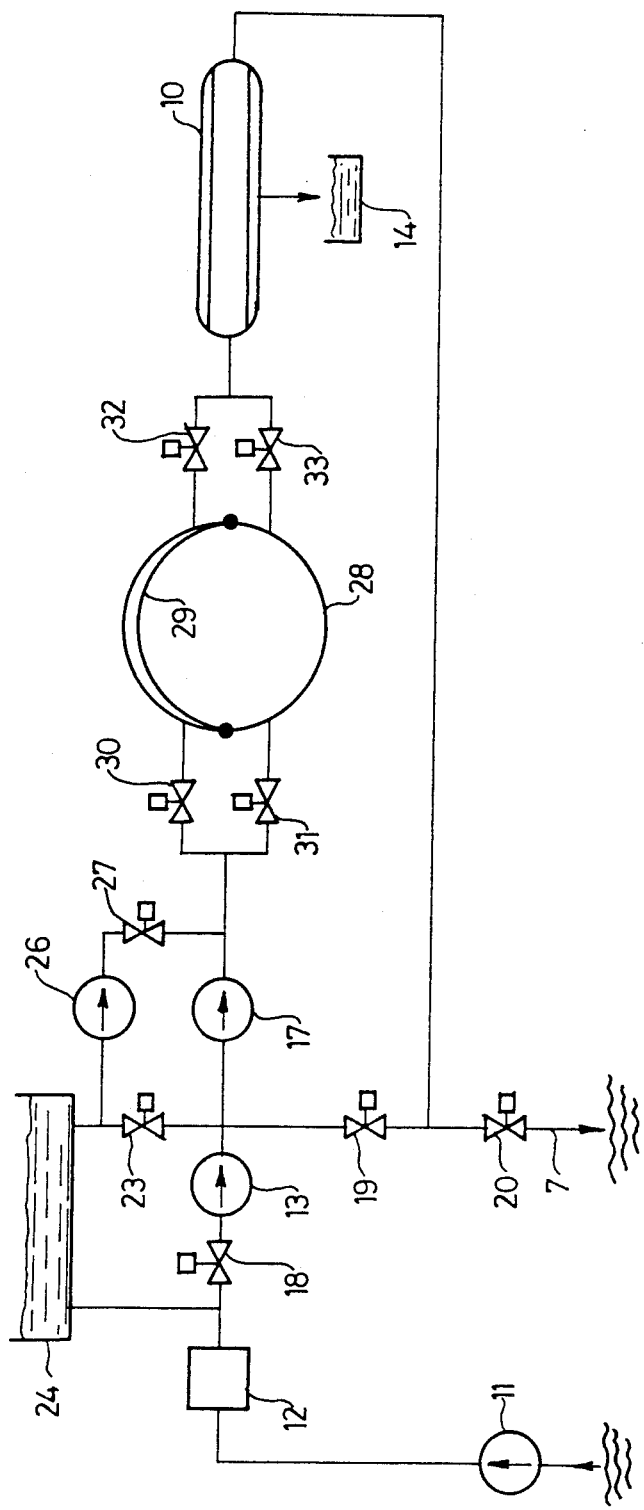
FIG. 8 is a connection diagram of an embodiment like that shown in FIG. 7.

It is shown in FIG. 8 that the inner space of a vessel 28, which corresponds to the vessel 25 of FIG. 7, is divided in two parts by a flexible membrane 29 in a way known by itself and these parts are connected through control valves 30, and 32 and 31, 33, respectively, to the fluid circle. During water purification the flexible membrane 29 is sticked to the wall in its first or second extrem position, and during filling-discharge the flexible membrane 29 separates from each other the fresh solution flowing in and the concentrated solution leaving. In this case during the filling-discharge phases water is exchanged only in the vessel 28 having a much bigger volume as the volume of the membrane filter equipment 10. In the different phases the open valves and the working pumps are the following.
Water purification: 18, 19, 31, 33; 11, 13, 17
Filling-discharge: 20, 23, 27, 30, 33; 11, 17, 26
Water purification: 18, 19, 30, 32; 11, 13, 17
Filling-discharge: 20, 23, 27, 31, 32; 11, 17, 26.

In the arrangements according to FIGS. 6 to 8 in every phase the pretreated raw water is accumulated in a particular vessel 24, which raw water is supplied into the fluid circle during the filling-discharge phase, said raw water pushing the concentrated water out of the fluid circle. During the filling-discharge phase the water purification does not work and this fact decreases the utilization of the membrane filter equipment 10 and the high pressure pump 13 as well as the relating instruments, control means, motors.

Figure 9:
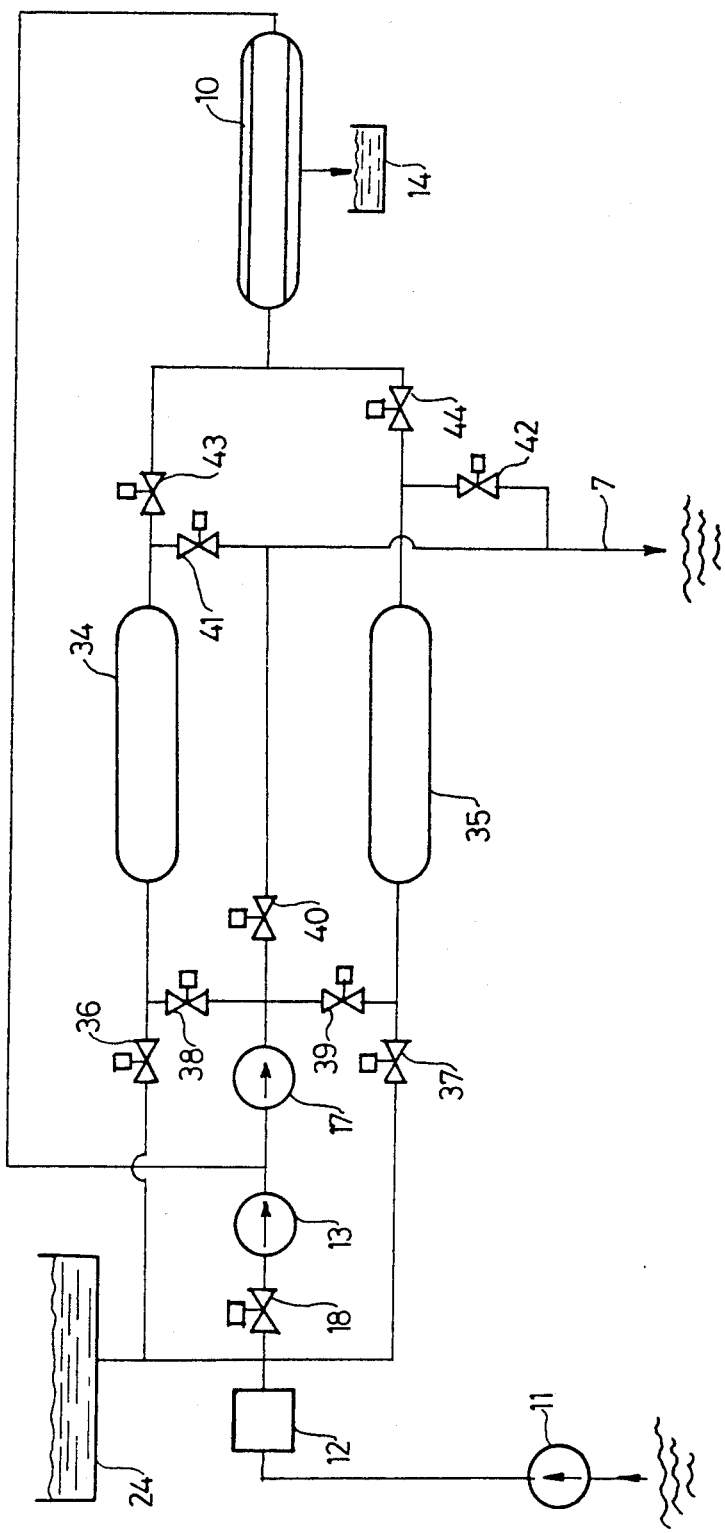
FIG. 9 is a connection diagram showing an embodiment of the apparatus according to the invention which makes possible an approximately continuous operation of the membrane filter equipment.

In FIG. 9 an embodiment is shown which ensures a continuous water purification operation besides the periodical fluid circulation according to the invention. For this arrangement a much smaller vessel 24 is necessary than those for the arrangements described above, even the vessel 24 is not needed at all at certain circumstances, but in the fluid circle there are two parallel vessels 34 and 35 which are connected to the fluid circle by control valves 38, 43 and 39, 44, respectively. The fluid circle is closed by a pipe connected between the suction side of the circulation pump 17 and the concentrate outlet of the membrane filter equipment 10. The fluid is circulated in said circle by the pump 17 and depending on the positions of valves 38, 39, 43 and 44 it is circulated either through the vessel 34 and the membrane filter equipment 10 or through the vessel 35 and the membrane filter equipment 10. The filling-discharge phase is provided by the force of gravitation from the vessel 24 either through the control valve 36, the vessel 34 and the control valve 41 or through the control valve 37, the vessel 35 and the control valve 42. The way of operation is as follows: during the phase when the fresh, pretreated water flows e.g. into the vessel 34 and the fresh water pushes the concentrated water out of that vessel 34 (by the help of a flexible membrane as it is shown in FIG. 8 or directly as it is shown in FIG. 9), the water being in the other vessel 35 is circulated under high pressure through the membrane filter equipment 10. A part of this water is pressed through the membrane filter in the membrane filter equipment 20 as pure water and the volume of the pure water corresponds to the volume of the pretreated water pressed into the fluid circle by the pump 13. When the water circulated has reached the prescribed concentration, and the water has been exchanged in the vessel 34 under low pressure, the valves 35, 37, 38, 39 and 41, 42, 43, 44 change and the two vessels 34 and 35 exchange their roles.

In the filling-discharge phase the water is exchanged in the vessel 34 or 35 but the concentrate remains in the membrane filter equipment 10. Therefore, it may be useful after having changed the vessels to apply such a filling-discharge phase in which the membrane filter equipment 10 is discharged through a control valve 40 and filled with pretreated water by the pump 17. This filling-discharge phase can be provided by gravitation from the vessel 24 or by a filling pump in such a way which is different from that shown in FIG. 9. In this embodiment the change of the concentrates contained by the vessels 34 and 35 are provided during the operation of the membrane filter equipment 10. The operation is interrupted only for exchange of concentrate contained by the membrane filter equipment 10 itself, and generally this is a much smaller quantity. In many cases the quantity of the concentrate remaining in the membrane filter equipment 10 is such a little part of the pretreated water fed into the vessels 34 or 35, respectively, that it has no reason to interrupt the operation of water purification. In this case the operation of the membrane filter equipment 10 is entirely continuous.

In the different phases of the embodiment shown in FIG. 9 the open valves and the working pumps are the following.

Water purification and filling-discharge 18, 38, 43, 37, 42; of a vessel: 11, 13, 17

Filling-discharge of the equipment: 37, 44, 40; 11, 17

Water purification and filling-discharge 18, 39, 44, 36, 41; of a vessel: 11, 13, 17

Filling-discharge of the equipment: 36, 43, 40; 11, 17.

Figure 10:
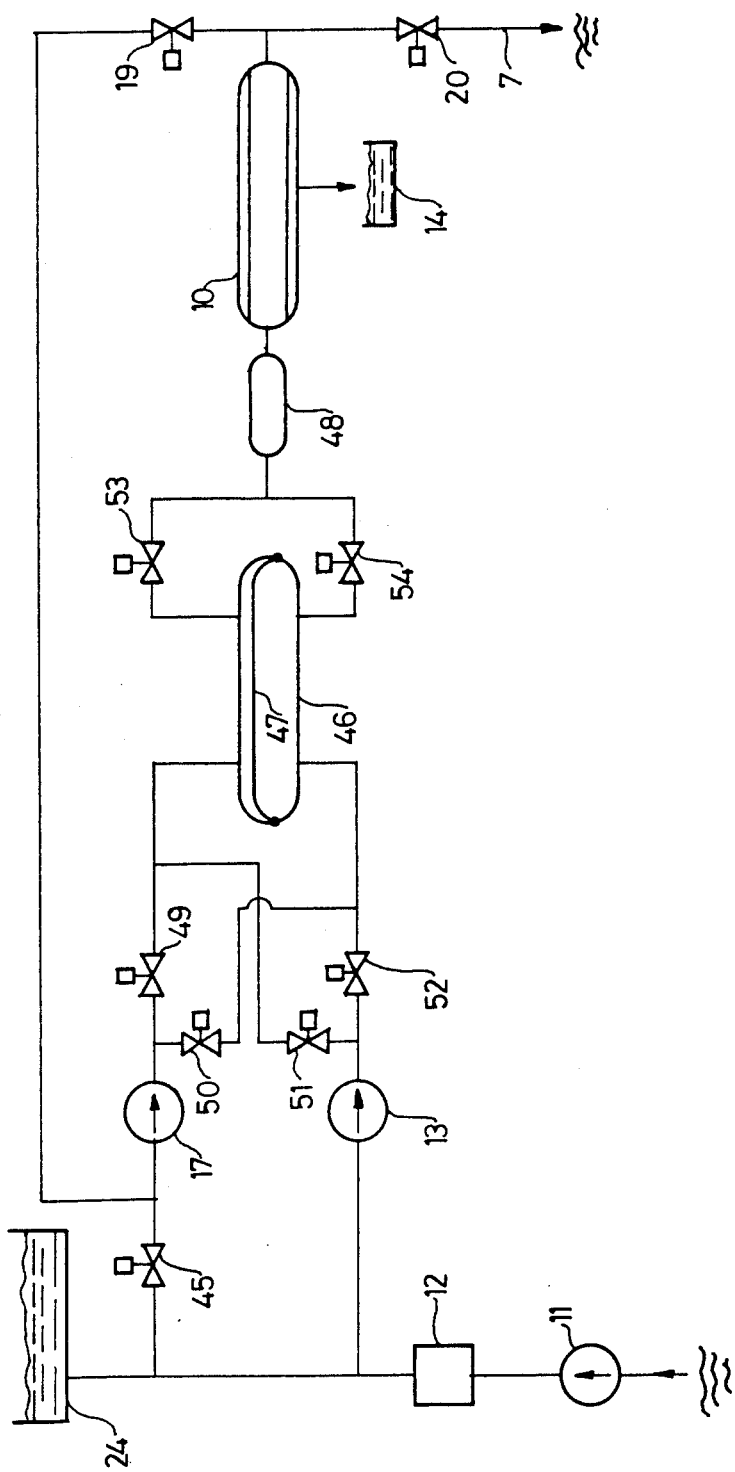
FIG. 10 is a connection diagram of an embodiment similar to that shown in FIG. 9.

In FIG. 10 an embodiment is shown which comprises, instead of two particular vessels 34 and 35 of FIG. 9, one single vessel 46 separated in two spaces by a flexible membrane 47 like that illustrated in FIG. 8. This embodiment, however, is significantly different from those described above, because the filling pump 13 does not press the pretreated seawater into a first space through which the fluid is circulated during the water purification phase but into another space separated from the first one by the flexible membrane 47. Thus, the fresh water pressed in by the filling pump 13 does not get mixed with the circulated concentrated water, consequently no entropia generation caused by mixing takes place and the energy consumption becomes more advantageous. In this embodiment it is useful to connect a further vessel 48 in series to the membrane filter equipment 10 so that after having turned the flexible membrane 47 of the vessel 46 on the other side the volume of the fluid circle is large enough to receive the remaining concentrate.

In the arrangement according to FIG. 10 the membrane filter equipment 10 connected in series to the vessel 48 is connected to the circulation pump 17 through the valve 19, and the fluid circle is closed through one of the spaces of the vessel 46 depending on the positions of the control valves 49, 50, 53 and 54. Meanwhile the pretreated seawater is pressed by the pump 13 under high pressure into the other space according to the positions of the control valves 51 and 52. After the water purification phases the exchange of the concentrate remaining in the membrane filter equipment 10 to pretreated seawater is provided through the control valve 45, the pump 17 and one of the spaces of the vessel 46. In the different phases the open valves and the working pumps are the following.

Water purification and filling of vessel 46: 19, 50, 54, 51; 11, 13, 17

Filling-discharge of the membrane filter equipment 10 and vessel 48: 20, 45, 49, 53; 11, 17

Water purification and filling of vessel 46: 19, 49, 53, 52; 11, 13, 17

Filling-discharge of the membrane filter equipment 10 and the vessel 48: 20, 45, 50, 54; 11, 17.

Figure 11:
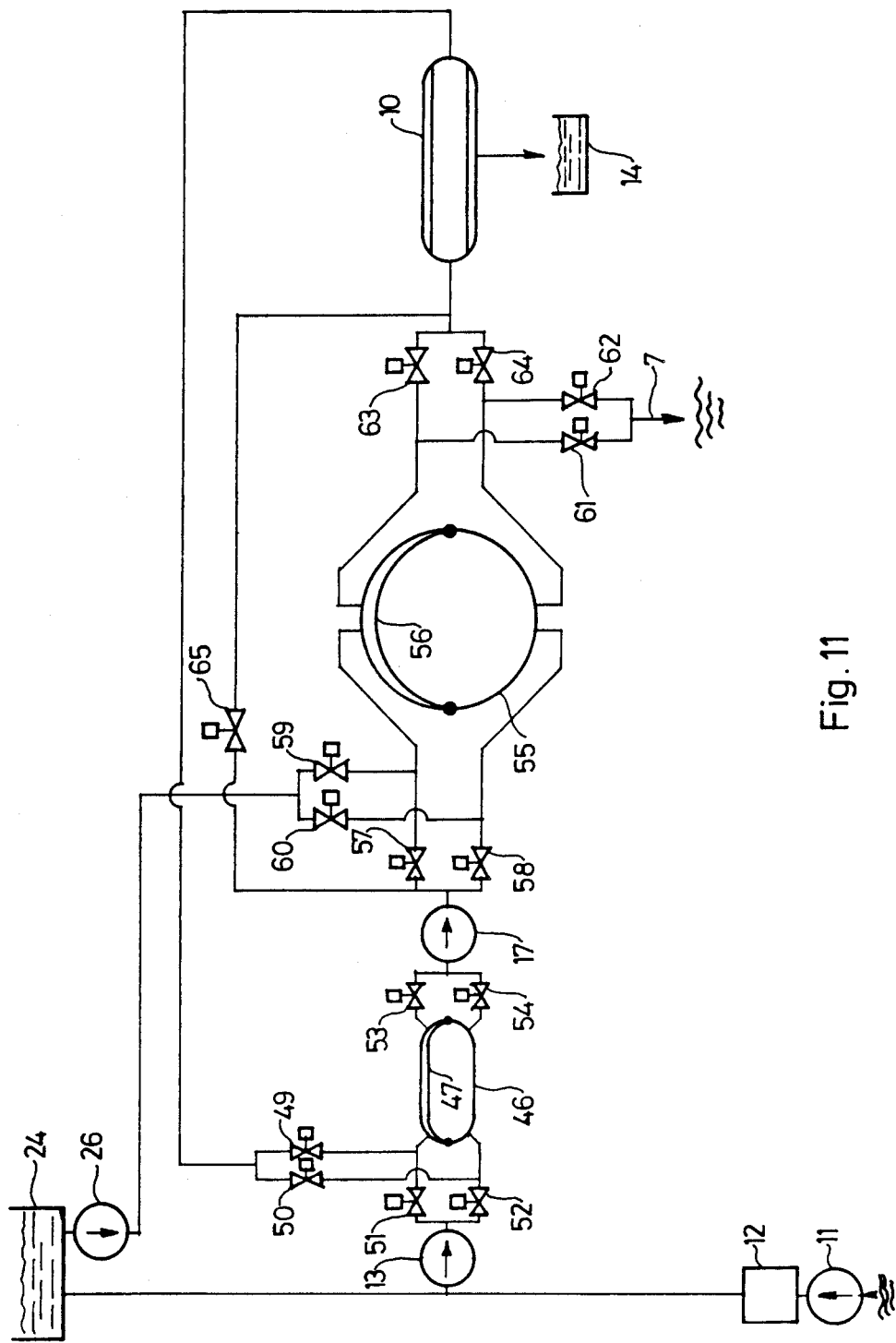
FIG. 11 is a connection diagram of an embodiment like that shown in FIG. 10.

In this case the water purification phase must be interrupted only for a relatively short time but this interruption may also be avoided by the embodiment according to FIG. 11.

In FIG. 11 there is a further vessel 55 connected in series to the vessel 46 and having also two spaces separated from each other by a flexible membrane 56. At any time only one of the spaces is connected into the fluid circle according to the positions of the control valves 57, 58, 63 and 64. The inlets and outlets of the fluid should be arranged in such a way, that the fluid is mixed well in the space during the circulation. The circulation pump 17 is arranged between the vessels 46 and 55. It is emphasized that a reasonable rearranging of the pumps and valves according to the circumstances does not influence the essence of the invention. The vessel 55 can be disconnected from the fluid circle by a parallel pipe containing a control valve 65, in this state the filling-discharge of the vessel 55 takes place according to the positions of the control valves 59, 60, 61 and 62 in such a way that the pretreated water delivered by the pump 26 is not mixed with the concentrate pushed out by the same. In the different phases the open valves and the working pumps are the following.

Water purification and filling of the vessel 46: 50, 54, 58, 64, 51; 11, 13, 17

Water purification and filling-discharge of the vessel 55: 49, 53, 65, 51, 59, 62; 11, 13, 17, 26

Water purification and filling of the vessel 46: 49, 53, 57, 63, 52; 11, 13, 17

Water purification and filling-discharge of the vessel 55: 50, 54, 65, 52, 60, 61; 11, 13, 17, 26.

During the operation the phases of filling-discharge of the vessel 55 and filling of the vessel 46 are changing each other while the water purification is provided continuously. However, the apparatus according to FIG. 11 can be made and can be operated also in such a way, that during the increase of the concentration of the content of the relatively big vessel 55 the spaces of the vessel 46 change more times. There can be applied less expensive non return valves instead of the control valves 49 and 50, furthermore it is possible to use a single valve instead of the valves 57 and 58 and another single valve instead of the valves 63 and 64. Instead of the shut off valves there are applicable more-way-armatures, too in a reasonable form.

The embodiment shown in FIG. 11 is an arrangement applying a lot of valves but these can be united in only one, or some pieces of more-way-armatures, e.g. in the case of a smaller apparatus and thus they can be handled easily.

Figure 12:
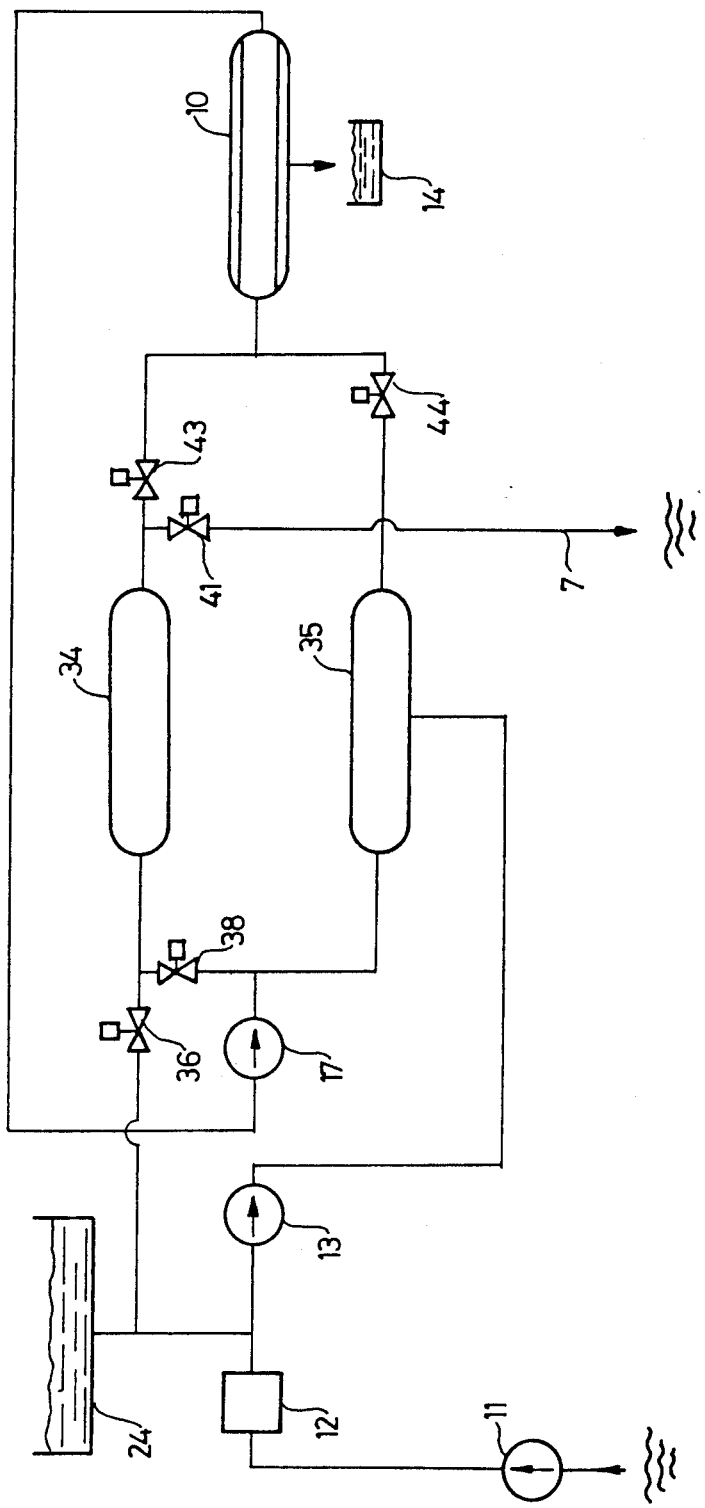
FIG. 12 is a connection diagram showing an embodiment of the apparatus according to the invention which provides an entirely continuous operation of the membrane filter equipment.

Such an embodiment is shown in FIG. 12 in which, like to that shown in FIG. 9, there are two parallel vessels 34 and 35 connected into the fluid circle alternatively according to the positions of the control valves 38, 43 and 44. The filling-discharge phase of the vessel 34 is provided through the valves 36 and 41, during this phase the vessel 35 is connected to the fluid circle. The pretreated seawater substituting the leaving permeate is fed into the fluid circle always through the vessel 35. In the different phases the open valves and the working pumps are the following.

Water purification: 38, 43; 11, 13, 17

Water purification and filling-discharge of the vessel 34: 44, 36, 41; 11, 13, 17.

Figure 13:
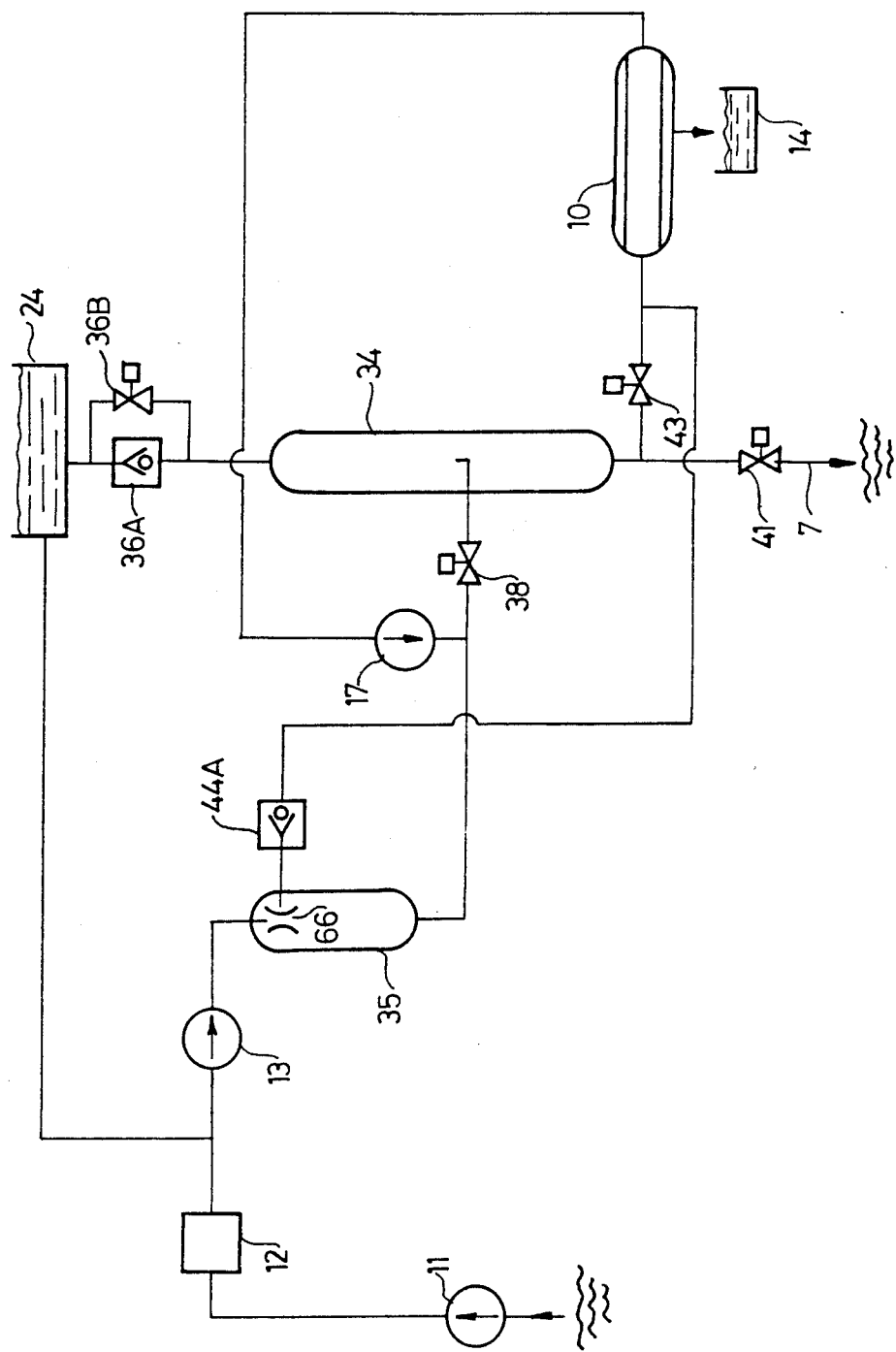
FIG. 13 is a connection diagram of an embodiment similar to that shown in FIG. 12.

In FIG. 13 there is an embodiment similar to that shown in FIG. 12. In this arrangement there are a non return valve 36A and a parallel control valve 36B of small size instead of the valve 36 of FIG. 12. The valve 44 of FIG. 12 is substituted by a non return valve 44A sucked by an ejector 66 arranged in the vessel 35. The shape of the vessels 34 and 35 and the positions of the inlets and outlets are providing for a suitable mixing of the fluid. The operation of the valves and the pumps is the same that is explained in connection with FIG. 12.

Figure 14:
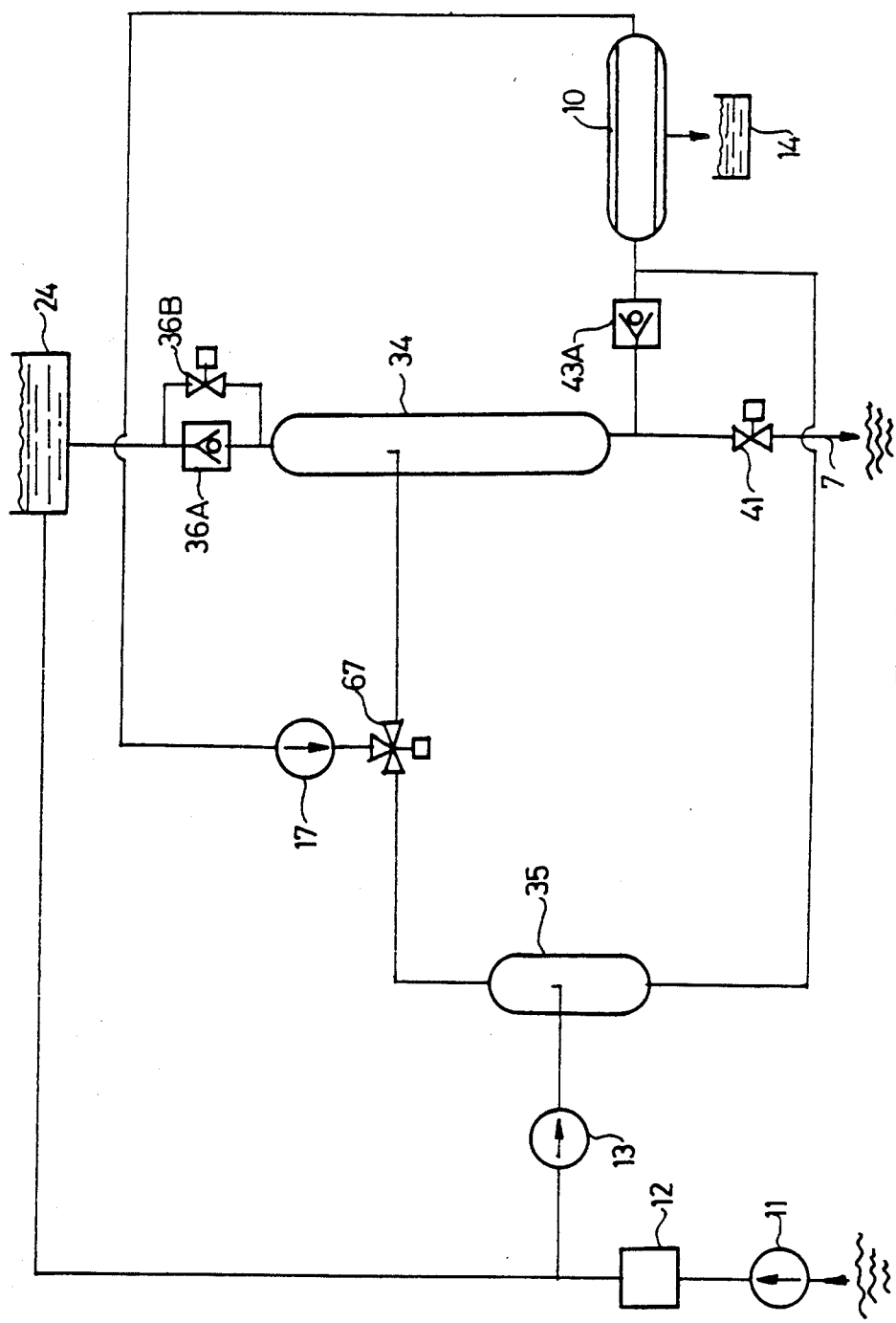
FIG. 14 is a connection diagram of an embodiment like that shown in FIG. 13.

FIG. 14 shows an arrangement like that shown in FIG. 13. In this embodiment there is a two way valve 67 instead of the valves 44A and 38 of FIG. 13 therefore it is possible to use a less expensive non return valve 43A instead of the control valve 43 of FIG. 13. The vessel 35 is connected inversely to that shown in FIG. 13. The operation of the valves and the pumps is the same as described in connection with FIG. 12.

Figure 15:
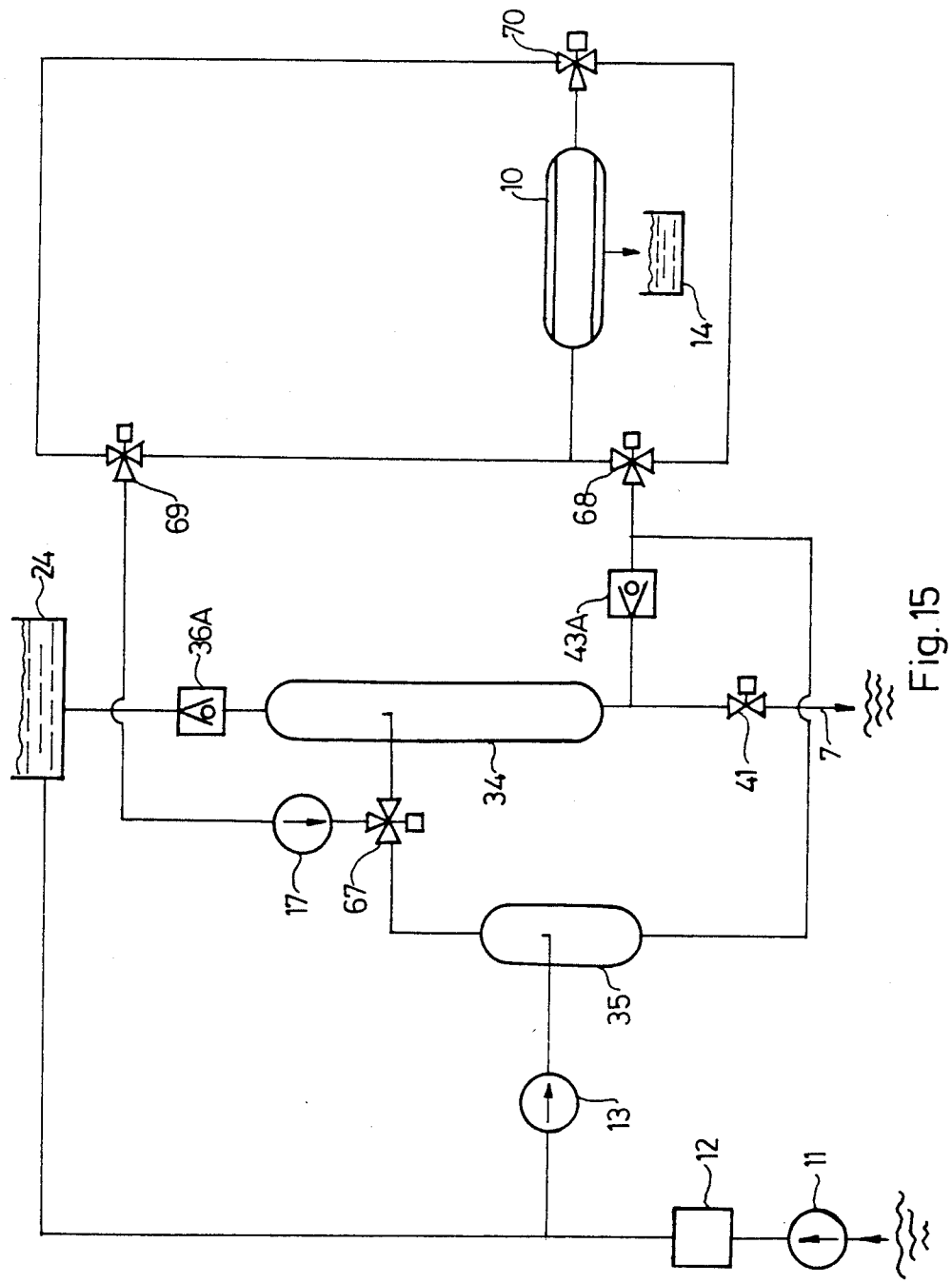
FIG. 15 is a connection diagram of an embodiment similar to that shown in FIG. 14 where the direction of the fluid-flow in the membrane filter equipment changes periodically.

In FIG. 15 an embodiment is shown similar to that of FIG. 14. In this arrangement a more intensive washing effect is achieved by also changing the direction of circulation of the fluid in the membrane filter equipment 10 when the phases are changed. For this effect the membrane filter equipment 10 is connected to the fluid circle by two way valves 68, 69 and 70. When the apparatus is realized in a smaller size the non return valve 36A is applicable without parallel bypass valve. For this embodiment there must be chosen such a membrane filter equipment 10 in which fluid can flow in two directions. In the different phases the open valves and the working pumps are the following.

Water purification: 67 right, 43A, 68 up, 70 up, 69 up; 11, 13, 17

Water purification and filling-discharge of vessel 34: 67 left, 68 up, 70 up, 69 up, 36A, 41; 11, 13, 17

Water purification: 67 right, 43A, 68 down, 70 down, 69 down; 11, 13, 17

Water purification and filling-discharge of vessel 34: 67 left, 68 down, 70 down, 69 down, 36A, 41; 11, 13, 17.

Some embodiments of the invention have been described and their operations have been explained above. In the following the advantages relating to the invention will be discussed.

Numerically the most simple is to estimate the energy consumption of the apparatus according to the invention. Considering that all of the embodiments have the same feature, that the high pressure pump 13 delivers only so much water as much permeate is generated, the energy consumption must be calculated according to this fact. It will be shown that the arrangement according to the invention is more advantageous than the arrangements known up to now from the point of view of the spoiling factor $\sigma^*$ and the mean value of P. First of all it is pointed but that, supposing the same pressure P and spoiling factor $\sigma^*$, the energy consumption of the apparatus according to the invention is significantly less than that of the solutions known. Energy consumption is given by the following equation in the case of the invention:

$$N = \frac{P}{36\eta_{sz}}\left(1 + k\frac{\Delta P}{P}\right) = \frac{N_o \cdot \sigma^*}{\eta_{sz}}\left(1 + k\frac{\Delta P}{P}\right). \quad (16)$$

Assuming again that $\eta_{sz}=0.5$, $k=3$ and $\Delta P/P=0.05$, there comes $$\frac{N}{N_o \cdot \sigma^*} = 2.3. \quad (17)$$

Comparing this value to the value 4.88 given by the equation (13) of the arrangement with a water turbine, or to the value 6.3 given by the equation (15) of the arrangement without water turbine—this latter is more realistic—there can be seen that the energy consumption decreases to cca 2.3/4.88=47% and to cca 2.3/6.3=36%, respectively, in comparison to the apparatus known.

The invention has, in addition to the advantageous energy consumption, also a further advantage, that is that a continuous selfpurification of the membrane filter is ensured in the membrane filter equipment 10. Namely, in the apparatus known a definite part of the membrane filter is always touched by a solution characterized continuously by the same concentration. For example, the concentration near to the inlet cross-section is near to the inlet concentration, and the same situation can be observed at the outlet. Obviously, the outlet solution of higher concentration begins to make dirty the last section of the membrane filter therefore the effective filtering surface begins to be shortened, the entire hydralic resistance increases, thus the pressure must be increased, consequently the quality of the permeate becomes worse, the quantity of the raw fluid must be decreased etc. Finally, the apparatus becomes so much dirty that it must be stopped. In such a case the usual procedure is to let the raw water be circulated under low pressure (thus without generation of permeate) along the filter surfaces of the membrane filter and in such a way the membrane filter is being washed, rinsed. In the procedure according to the invention the first part of every period can be taken into consideration as a rinsing, because fresh raw water is circulating along the whole filtering surface of the membrane filter and with a speed limited only by the geometric features of the membrane filter. This speed is generally much higher than that used in the known solutions, because in these the higher gain can be achieved by lower speed of fluid, only.

In the invention the membrane filter is being purificated continuously. At the end of the phase of water purification the filtering surface of the membrane filter becomes a bit dirty but at the beginning of the next period that dirtiness is rinsed by the fresh raw water. The speed of the rinsing water flowing along the filtering surfaces is constant and the highest possible, and it does not depends on the degree of the dirtiness or on the place. The utilization of the membrane filter is constant, the fore part and the end of the membrane filter operates under the same load of concentration. All of that result in that the membrane filter becomes dirty and goes wrong in a much longer time than in the case of the known arrangements.

The constant rinsing and constant way of operation of the membrane filter described above explains that our method makes it possible to simlify the pretreatment of the raw water in some given case. In the methods known up to date it must be used such a pretreatment which prevents the separation of salts out of the concentrated solution. That needs complicated equipment and the use of dangerous chemicals (acids, alcalics). By the method according to the invention because of the phenomenon of self-purification it is allowable in some given case crystal powder of very small sized particles to be contained by the solution, thus in the water pretreatment equipment 12 there are applicable poliphosphats or polielectrolits for water treatment.

Figure 16:
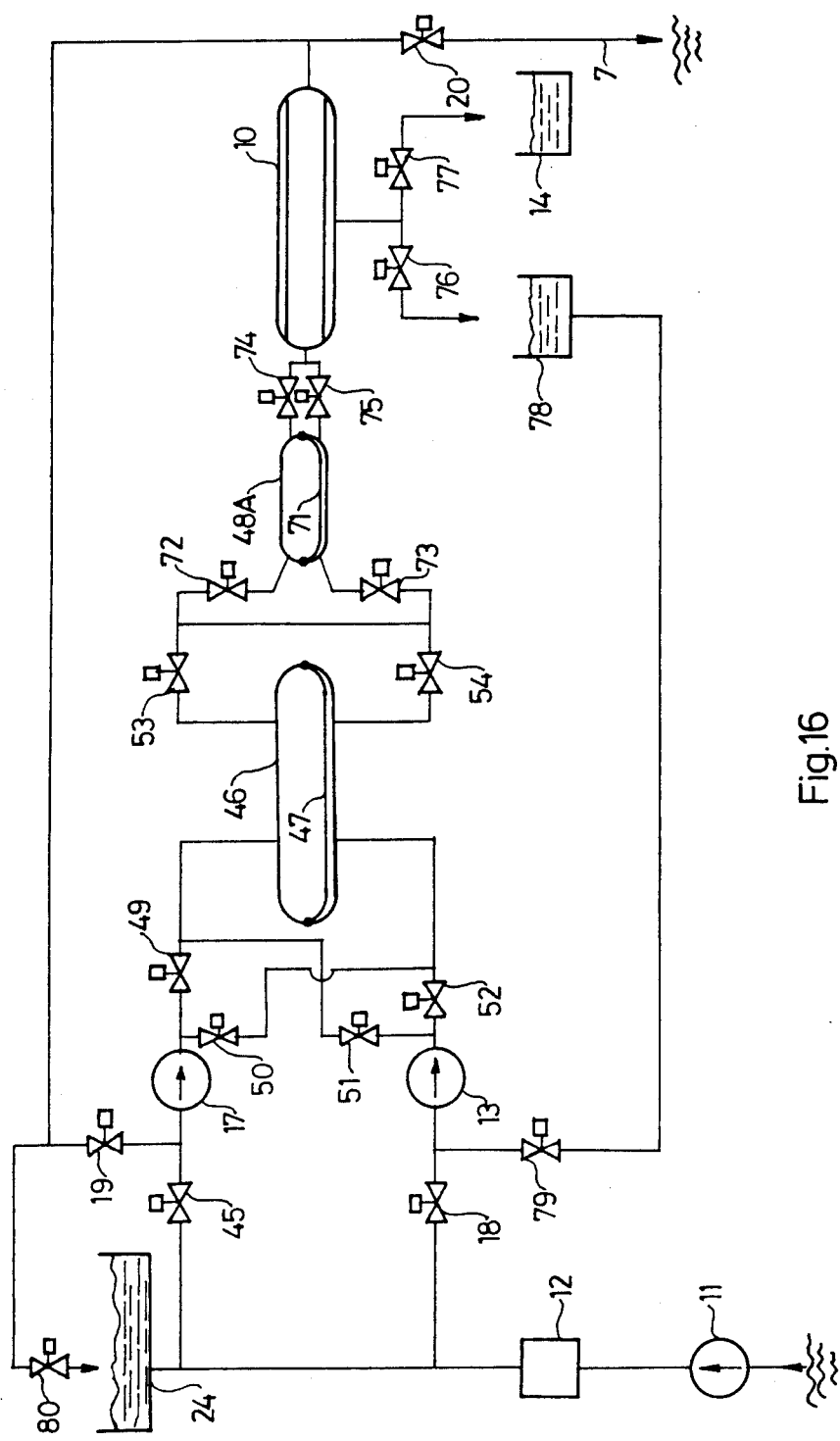
FIG. 16 is a connection diagram of an embodiment of a two-stage apparatus according to the invention. The same elements or the elements of the same function have the same reference numbers in the figures.

Considerations taken above make it also clear that in certain cases why is it useful to apply the embodiment shown in FIG. 16.

FIG. 16 shows a two stage embodiment of the apparatus according to the invention. A two stage apparatus is used when the result achievable by a one stage apparatus is not sufficient, e.g. the permeate is not pure enough because of the high salt content of the seawater in the case of desalination of seawater. In this case the method known up to now is that the permeate produced by the first stage is pressed by a high pressure pump into a second stage, the permeate of which is already pure enough. In this case the concentrate of the second stage is generally fed back to the first stage as raw water.

Such a two stage apparatus naturally can be constructed in such a way too, that both of the filter apparatuses applied in this arrangement are constructed according to the invention. But a plus advantage can be achieved mainly in connection with selfpurification, when the arrangement shown in FIG. 16 is used. The difference is, in comparison to the one stage apparatus shown in FIG. 10, that the permeate can flow into two different vessels 14 or 78 according to the positions of control valves 76 and 77; the suction side of the pump 13 supplying fresh fluid to be purificated can be connected either to the raw water vessel 24 or to the middle permeate vessel 78 according to the positions of control valves 18 and 79; the vessel 48A is also provided with a separating flexible membrane 71 and the vessel 48A is connected in the fluid circle by control valves 72, 73, 74 and 75; furthermore the concentrate can be fed back to the vessel 24 through a control valve 80.

The apparatus operates as follows. The fluid system filled with raw water is circulated by pump 17, the pump 13 presses permeate from vessel 78 into the first space of the vessel 46 which permeate pushes raw water out of the second space by turning over the flexible membrane 47 of the vessel 46 therefore the permeate is pressed through the membrane of the membrane filter equipment 10 and gets into the vessel 78 through the valve 76, consequently the level of the permeate is constant in the vessel 78. This phase is finished when the vessel 46 is filled with permeate. Subsequently, the first space in which raw water was circulated by the circulation pump 17 and which is now filled with concentrate gets open to the atmosphere by opening the valve 20 and then the pump 17 presses fresh pretreated seawater from vessel 24 into vessel 48A and into the membrane filter equipment iD and so the concentrate will be pushed out of that space.

In the next phase the permeate of the first phase is circulated by pump 17 and fresh pretreated seawater is pressed by pump 13 from vessel 24 into the other space of the vessel 46 and in this way the permeate, a double filtered water is pressed into the vessel 14 through the valve 77. When the permeate circulated in the fluid circle is properly concentrated, the concentrate is discharged into the vessel 24 by opening the valve 80 and so that phase has finished. After that the valves change and a new period of five phases starts.

Supposing that at the start the positions of the flexible membranes 47 and 71 are as shown in FIG. 16, in the consecutive phases the open valves and the working pumps are the following.

PERIOD I

Water purification and retaining the first permeate: 19, 49, 53, 72, 74, 76, 79, 52; 11, 13, 17

Filling-discharge of vessel 48A: 45, 49, 53, 73, 74, 20; 11, 17

Filling-discharge of the membrane filter equipment 10: 45, 49, 53, 73, 75, 20; 11, 17

Water purification by making the first permeate circulated: 19, 50, 54, 72, 74, 77, 18, 51; 11, 13, 17

Discharge of the concentrate to the vessel 24: 45, 49, 53, 73, 75, 80; 11, 17.

PERIOD II

Water purification and retaining the first permeate: 19, 49, 53, 73, 75, 76, 79, 52; 11, 13, 17

Filling-discharge of vessel 48A: 45, 49, 53, 72, 75, 20; 11, 17

Filling-discharge of the membrane filter equipment 10: 45, 49, 53, 72, 74, 20; 11, 17

Water purification by making the first permeate circulated: 19, 50, 54, 73, 75, 77, 18, 51; 11, 13, 17

Discharge of the concentrate to the vessel 24: 45, 49, 53, 72, 74, 80; 11, 17.

The regulations described above can be realized in an advantegeous way by a control device provided with a microprocessor. In the two stage apparatus, instead of the vessel 48A shown in the figure, there can also be used a vessel without a separating flexible membrane, to which a pipe is connected parallel, said pipe being provided with a control valve.

The advantage of the above two stage method is that the rinsing of the membrane filter is performed also by a water of quality of permeate once in every period during the fourth phase. This increases the selfpurification just in such cases when the selfpurification is extremely important because of the very concentrated raw water to be treated.

We claim:

1. In a method for treating fluids containing foreign materials by membrane filter equipment, comprising the steps of supplying a fluid to be treated to an inlet of the membrane filter equipment, producing in said equipment a concentrate containing more foreign material than the fluid supplied to said inlet and a permeate containing less foreign material than the fluid supplied to said inlet, circulating the fluid in a fluid circuit through said equipment under a predetermined pressure by recycling at least a part of the concentrate leaving the equipment to said inlet and repeating said circulation step with fresh fluid to be treated; the improvement in which the concentrate leaving the equipment is recycled to said inlet alternately through a first branch and a second branch during alternate circulation periods, each of said branches comprising a fluid storing device.

2. The method according to claim 1, further comprising discharging the concentrated fluid from that part of the fluid circuit, which is not then in use for recycling the concentrate, by introducing thereinto fresh fluid to be treated.

3. The method according to claim 2, further comprising discharging the concentrated fluid after each circulation period at least partly during the next circulation period.

4. The method according to claim 2, further comprising discharging the concentrated fluid after each second circulating period at least partly during the next circulation period.

5. The method according to claim 2, wherein the discharge of the concentrated fluid and the introduction of the fresh fluid to be treated are effected such that the two fluids are separate from each other.

6. The method according to claim 1, further comprising maintaining said predetermined pressure during the circulation while the volume of the circulated fluid is decreasing in consequence of said permeate leaving said equipment.

7. The method according to claim 1, further comprising continuously feeding fresh fluid to be treated under said predetermined pressure during the circulation to replace the permeate leaving said equipment.

8. The method according to claim 1, further comprising circulating the fluid through said equipment and one of two parallel vessels while the concentrated fluid is being discharged from the other of the vessels and fresh fluid to be treated is being fed into said other of the vessels, then the vessels are switched over and said steps are repeated.

9. The method according to claim 1, further comprising circulating the fluid through said equipment and two vessels connected in series, one of the vessels having a first space and a second space separated from each other by a flexible membrane, during the circulation through the first space of said one of the vessels fresh fluid to be treated is fed under said predetermined pressure into the second space, after having reached a predetermined concentration value the concentrated fluid is discharged by introducing fresh fluid to be treated, then the first and second spaces are switched over and said steps are repeated.

10. The method according to claim 1, further comprising circulating the fluid through said equipment and two vessels connected in series, one of the vessels having a first space and a second space separated from each other by a flexible membrane, during the circulation through the first space of said one of the vessels fresh fluid to be treated is fed under said predetermined pressure into the second space, after having reached a predetermined concentration value the other of the vessels is disconnected from the circuit in which the fluid is circulated and the circulation is continued through the membrane filter equipment and said one of the vessels while the concentrated fluid is discharged from said other of the vessels by introducing fresh fluid to be treated, then said other of the vessels is reconnected to said circuit and said steps are repeated.

11. The method according to claim 1, further comprising circulating the fluid through said equipment and a first one of two parallel vessels in such a way that for replacing the leaving permeate fresh fluid to be treated is fed under said predetermined pressure into the circuit in which the fluid is circulated through a second one of said two parallel vessels, after having reached a predetermined concentration value said second vessel is connected in place of said first vessel and the circulation is continued while the concentrated fluid is discharged from said first vessel by introducing fresh fluid to be treated into said first vessel, then said first vessel is reconnected in place of said second vessel and said steps are repeated.

12. The method according to claim 11, wherein upon switching over said vessels or said spaces, the direction of connection of said equipment is reversed in the fluid circuit.

13. The method according to claim 1, further comprising circulating the fluid through said equipment and two vessels connected in series, one of the vessels having a first space and a second space separated from each other by a flexible membrane, during the circulation through the first space of said one of the vessels the permeate leaving the membrane filter equipment is fed under said predetermined pressure into the second space, after having reached a first predetermined concentration value the concentrated fluid is discharged by introducing fresh fluid to be treated, then the first and second spaces are switched over and the permeate stored in the second space is circulated while fresh fluid to be treated is fed under said predetermined pressure into the first space, after having reached a second predetermined concentration value the concentrate of the permeate is discharged by introducing fresh fluid to be treated, then the first and second spaces are switched over and said steps are repeated.

14. An apparatus for treating fluids containing foreign materials, comprising
 membrane filter equipment having an inlet for receiving the fluid to be treated, a first outlet for withdrawing a concentrate and a second outlet for withdrawing a permeate;
 a fluid circuit for recycling at least a part of the concentrate from said first outlet to said inlet of said equipment, said fluid circuit including a first branch comprising a first fluid storing device and a second branch comprising a second fluid storing device;
 means for feeding the fluid to be treated into the fluid circuit;
 means for removing concentrated fluid from the fluid circuit;
 means for recirculating the fluid in the fluid circuit periodically and alternately through the first branch and the second branch; and
 means for establishing a predetermined pressure substantially throughout the fluid circuit during circulation periods.

15. The apparatus according to claim 14, wherein the first fluid storing device is a first vessel and the second fluid storing device is a second vessel.

16. The apparatus according to claim 15, wherein the first and the second vessels are connectable alternately so that one of them is connected in the fluid circuit in series with said equipment and the other is connected between said feeding means and said removing means.

17. The apparatus according to claim 15, wherein the first and the second vessels are connectable alternately into the fluid circuit in series to said equipment, the first vessel being disconnected from the fluid circuit is connected between said feeding means and said removing means and said means for establishing a predetermined pressure is a pump having a high pressure side connected to the fluid circuit through the second vessel.

18. The apparatus according to claim 17, wherein said equipment is provided with valves for reversing the direction of connection of said equipment into the fluid circuit.

19. The apparatus according to claim 14, wherein the first and the second fluid storing devices are constituted by two spaces of a vessel, said two spaces being separated from each other by a flexible membrane, said means for establishing a predetermined pressure is a pump, said two spaces are connectable alternately into the fluid circuit in series to said equipment, whichever space is disconnected from the fluid circuit being connected to a high pressure side of the pump, and the fluid circuit comprising a further vessel connected in series to said equipment for increasing the volume of the fluid circuit.

20. The apparatus according to claim 19, wherein between circulation periods the vessel, the further vessel and said equipment are connected in series between said feeding means and said removing means by control valves.

21. The apparatus according to claim 19, wherein the second outlet of the membrane filter equipment is connected either to a first permeate vessel or to a second permeate vessel by first control valves, the first permeate vessel is connected to a suction side of the pump by a second control valve, and the first outlet of the membrane filter equipment is connected either to said removing means or to a vessel containing the fluid to be treated by third control valves.

22. The apparatus according to claim 19, further comprising a conduit provided with a control valve connected in parallel to said further vessel and that said further vessel disconnected from the fluid circuit is connected between said feeding means and said removing means.

23. The apparatus according to claim 22, wherein the further vessel has two spaces separated from each other by a flexible membrane, and while the further vessel is disconnected from the fluid circuit said feeding means are connected to one of the spaces and said removing means is connected to the other of said spaces.

24. The apparatus according to claim 14, wherein in order to feed the fluid to be treated without air said feeding means is provided with a reserve vessel.

* * * * *